Feb. 19, 1957  R. F. CAUGHILL  2,782,008
HEAT EXCHANGERS FOR FLUIDS
Filed Dec. 9, 1953  2 Sheets-Sheet 1

INVENTOR
Robert F. Caughill
BY
ATTORNEY

Feb. 19, 1957 R. F. CAUGHILL 2,782,008
HEAT EXCHANGERS FOR FLUIDS
Filed Dec. 9, 1953 2 Sheets-Sheet 2

INVENTOR
Robert F. Caughill
BY
ATTORNEY

2,782,008

HEAT EXCHANGERS FOR FLUIDS

Robert F. Caughill, Lockport, N. Y., assignor to General Motors Corporation, Detroit, Mich., a corporation of Delaware Application December 9, 1953, Serial No. 397,168

2 Claims. (Cl. 257—198)

This invention relates to heat exchangers for use with fluids and more particularly to heat exchangers adapted for the cooling of fluids utilized in the operation of hydraulic transmissions.

In automotive vehicles, automatic transmissions have come into popular use and the oils employed in such transmissions become heated to temperatures sufficiently high to cause the transmissions to be less effective in some respects than would be desirable. An elevation in the temperature also causes the oils to become less efficient insofar as their characteristics as a lubricant are concerned. Cooling of the oil is therefore necessary and heretofore the necessary apparatus provided for this purpose has been cumbersome, difficult to install and troublesome to maintain.

One object of the present invention is to provide an improved heat exchanger for fluids which is efficient in use, easily manufactured and which may be installed without difficulty where space is limited.

A feature of the invention comprises a pan-like container with a partition dividing the interior thereof to form a lower compartment in which heat transfer means is placed for intimate contact with shallow streams of fluid to be treated.

Another feature of the invention is a pan-like heat exchanger having a shallow or bottom compartment in which a heat transfer means is installed for conducting heat between a first fluid flowing in one direction and a second fluid flowing transverse and counter to the flow of the first fluid.

These and other important features of the invention will now be described in detail in the specification and pointed out more particularly in the appended claims.

Figure 1:
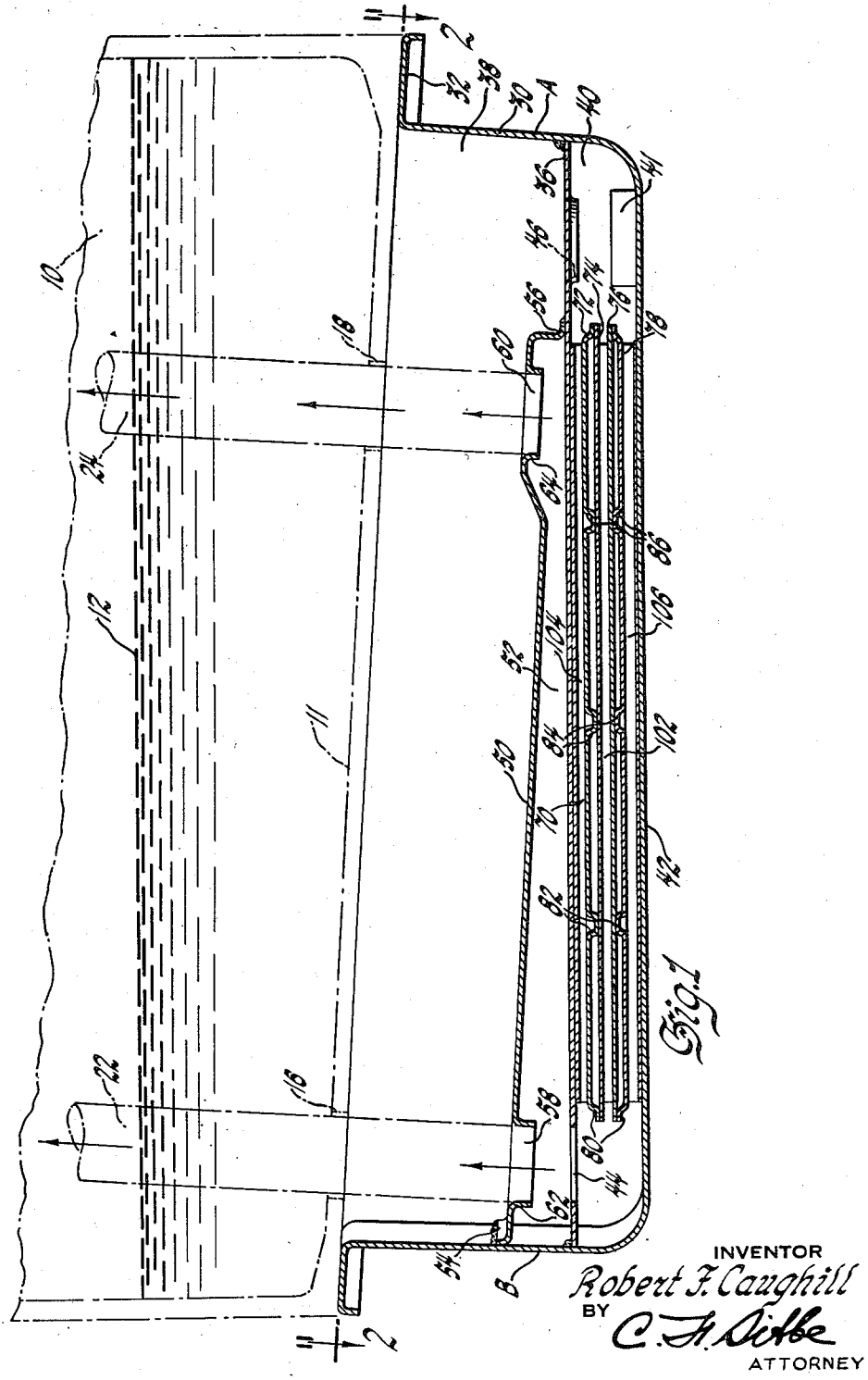
Fig. 1 is a sectional view through a heat exchanger embodying the principles of the present invention and as positioned upon the transmission housing of an automotive vehicle.

In Fig. 1 an automatic vehicle transmission housing 10 is shown diagrammatically in dot-and-dash lines. As conventionally utilized, the bottom 11 of such a housing 10 is inclined slightly to the horizontal and the housing is adapted to hold oil up to a level indicated at 12. The bottom 11 of the housing 10 is provided with two openings 16 and 18 through which are extended two pipes or tubes 22 and 24, respectively. The openings are of such size as to leave substantial clearance around the tubes. These tubes 22 and 24 are adapted to serve as intake pipes for two pumps in the transmission which are employed to circularize the oil therein. The bottom portion of the housing 10 serves as a sump for this circulated oil. The matter thus far described does not form a part of the present invention and may well be on some installation other than on a vehicle transmission as will be understood; the purpose of the invention being to provide a unit for cooling the oil or other fluid in the sump of any circulatory system.

The exchanger of the present invention comprises a pan-like container 30 having an open top with an attaching flange 32. Spaced holes 34 are provided along the flange 32 by means of which bolts may be employed to attach the pan 30 to the housing 10.

The interior of the container 30 is divided by a horizontal partition 36 the edges of which are welded to the interior walls of the container 30 thereby dividing the interior of the latter into an upper compartment 38 and a smaller lower compartment 40. Preferably, the partition 36 is arranged in parallel with the bottom 42 of the container 30. A boss 41 is provided into which a clean-out plug (not shown) may be threaded.

Contiguous to opposite sides A and B of the container 30 two spaced apertures or openings 44 and 46 are provided leading through the partition 36.

An elongated or channel member 50 is supported within the container 30 and attached to the partition 36. This elongated member 50 cooperates with the partition 36 to define a chamber 52 of elongated configuration which is in communication with the aperture 44. The elongated member 50 is flanged as at 54 for attachment by welding to the wall B of the container 30. It is also flanged as at 56 along its sides which taper slightly and around one end. Flange 56 is joined to the partition 36 by welding.

Two spaced openings 58 and 60 are provided in the elongated member 50. These openings 58 and 60 are defined by depending flanges 62 and 64, respectively, and the interior diameters thereof are such as snugly to receive the ends of the tubes 22 and 24 respectively.

Figures 2, 3:
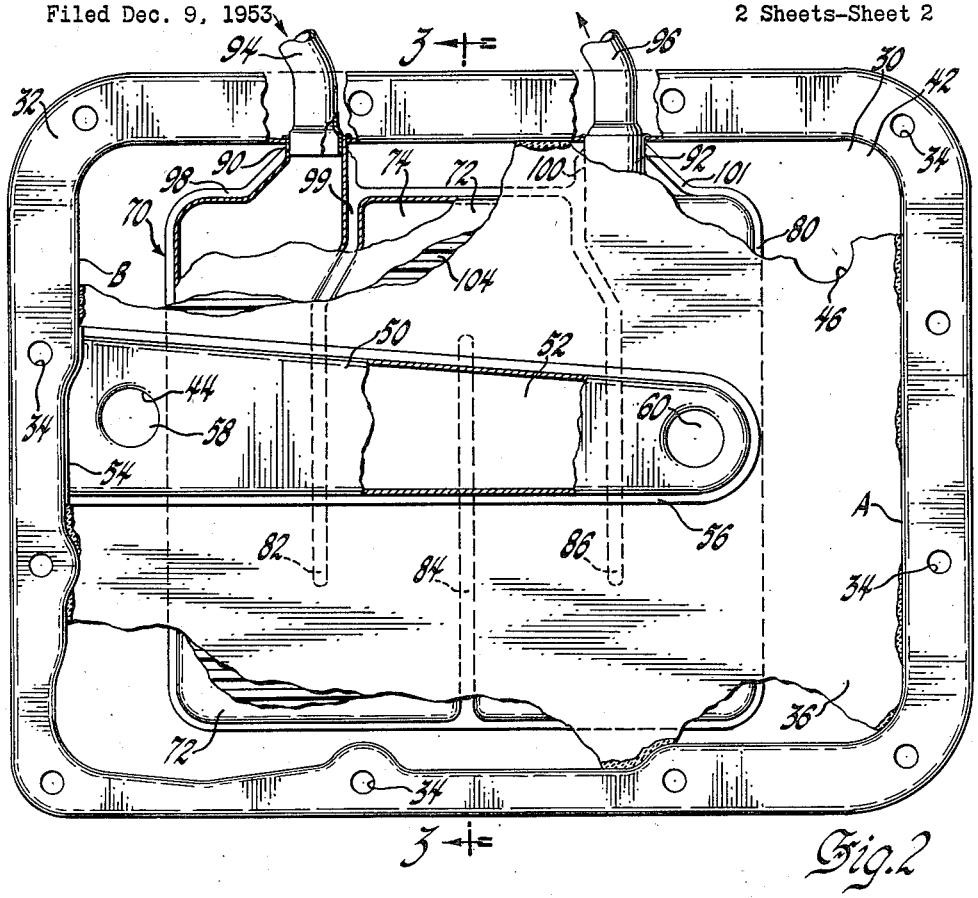
Fig. 2 is a plan view, drawn to a smaller scale, of the heat exchanger shown in Fig. 1, parts being broken away for clarity of illustration.
Fig. 3 is a sectional view taken along the line 3—3 of Fig. 2 and drawn to a larger scale.

Within the lower or bottom chamber 40 of the container 30 and spaced from the partition 36 as well as from the bottom 42 of the container is provided a heat transfer means generally indicated at 70 and made of four plates 72, 74, 76 and 78. The plates 72 and 78 are similarly constructed in that they are made with exterior flanges 80 and each is provided with parallel ridges 82, 84 and 86 arranged with their inner ends in staggered relation as shown in Fig. 2. The plate 72 is joined to the flat plate 74 with the ridges 82, 84 and 86 of plate 72 defining a zigzag passage. The plates 76 and 78 are similarly joined to form a second zigzag passage. The heat transfer means or walled chamber 70 is so made at tubular joints 90 and 92 that communication is had between an inlet tube 94 and an outlet tube 96 respectively. The upper two plate portions of the heat transfer means 70 forms a unit that is separated at one side from the lower equivalent portion by means of offset flanges at 98, 99, 100 and 101 made along two opposite sides of each of the joints 90 and 92. These two heat transfer portions are also separated by flow separating means 102 interposed therebetween. This flow separating means 102 preferably may be in the form of corrugated sheet metal but may take various forms and may be termed a fin section. The means 102 is so arranged as to guide the flow of fluid in contact therewith in one direction.

Additional flow separating means 104 and 106 are utilized to space the heat transfer means 70 from the partition 36 and the bottom 42, respectively. It will be noted that the flow separating means 102, 104 and 106 may each take various forms but they all cooperate by directing fluid in contact therewith to flow in the same direction.

In operation of the device, pumps not disclosed herein but commonly employed in the transmission housing 10 receive oil from the heat transfer means 70 through the tubes 22 and 24. As the oil is circulated in the transmission it becomes heated and flows down into the bottom of the housing 10 from which it is permitted to flow through the annular clearance spaces in the openings 16 and 18 and down into the container 30 keeping the latter full. This oil flows downwardly through the opening 46 in the partition 36 and is directed from right to left as viewed in Fig. 2 by the flow separating means 102, 104 and 106 ultimately to be drawn up through the opening 44 into the chamber 52 defined by the channel member 50 acting in cooperation with the partition 36. Part of the oil in this chamber 52 is caused to flow through the opening 58 and up through the tube 22. The remainder of the oil flows to the right within the chamber 52 as viewed in Figs. 1 and 2 and rises through the opening 60 and up through the tube 24.

Cooling of the oil is effected by the forcing of a cooling fluid such as water from a car radiator through the connection 94 and along the zigzag passages of the heat transfer means 70 to the outlet tube 96.

Having described my invention, what I claim as new and desire to secure by Letters Patent of the United States is:

1. A heat exchanger comprising a shallow pan-like container with a flanged open top, a partition dividing the interior of said container into an upper compartment and a smaller lower compartment, an aperture contiguous to each of opposite sides of said container and leading through said partition, a channel member cooperating with said partition to define a chamber in communication with only one of said apertures, spaced upwardly directed openings in said channel member, heat transfer means located in said lower compartment and having separate chambers, means for conveying a first fluid into and away from the said chambers of said heat transfer means, and flow separating means arranged in said lower compartment to direct a second fluid in one direction and in contact with wall portions of said heat transfer means, the said partition and the bottom of said container.

2. A heat exchanger unit adapted to form a cover for a sump, said unit comprising a relatively shallow container with an open side flanged at its periphery to facilitate attachment of the container to said sump, a partition spaced from said open side dividing the interior of said container into upper and lower compartments, said partition having spaced openings therein, means in the form of an inverted trough secured to the upper side of said partition and defining a passage with one end communicating with one of said openings, said trough means having means for upwardly discharging fluid received through said one opening, heat exchanger means arranged in said lower compartment and through which fluid received from said sump through said partition may be circulated, said heat exchanger means including multiple sets of plates, at least one plate of each of said sets having depressed portions or ribs defining a tortuous passage for a fluid within that set, and said sets being separated from each other and the interior walls of said lower compartment by flow separating means.

References Cited in the file of this patent

UNITED STATES PATENTS

| | | |
|---|---|---|
| 791,876 | Burdh | June 6, 1905 |
| 1,876,648 | Elfes | Sept. 13, 1932 |
| 1,966,133 | Pieper | July 10, 1934 |
| 1,976,772 | Clarke | Oct. 16, 1934 |
| 2,063,782 | Barnes | Dec. 8, 1936 |
| 2,222,721 | Ramsaur et al. | Nov. 26, 1940 |
| 2,435,041 | Hild | Jan. 27, 1948 |
| 2,576,213 | Chausson | Nov. 27, 1951 |